US012352771B2

(12) United States Patent
Yokoyama et al.

(10) Patent No.: US 12,352,771 B2
(45) Date of Patent: Jul. 8, 2025

(54) AUTOMATIC ANALYSIS DEVICE

(71) Applicant: HITACHI HIGH-TECH CORPORATION, Tokyo (JP)

(72) Inventors: Koki Yokoyama, Tokyo (JP); Takenori Okusa, Tokyo (JP); Nobuyuki Isoshima, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 579 days.

(21) Appl. No.: 17/801,036

(22) PCT Filed: Feb. 19, 2021

(86) PCT No.: PCT/JP2021/006240
§ 371 (c)(1),
(2) Date: Aug. 19, 2022

(87) PCT Pub. No.: WO2021/182068
PCT Pub. Date: Sep. 16, 2021

(65) Prior Publication Data
US 2023/0102788 A1    Mar. 30, 2023

(30) Foreign Application Priority Data
Mar. 11, 2020  (JP) .................................. 2020-041724

(51) Int. Cl.
*G01N 35/10* (2006.01)
*G01N 35/00* (2006.01)
*G01N 35/04* (2006.01)

(52) U.S. Cl.
CPC .................... *G01N 35/1002* (2013.01); *G01N 2035/00386* (2013.01); *G01N 2035/00435* (2013.01);
(Continued)

(58) Field of Classification Search
CPC ........... B01L 2200/141; B01L 2200/16; B01L 2300/10; B01L 2300/1894; B01L 7/00;
(Continued)

(56) References Cited

U.S. PATENT DOCUMENTS

2005/0123445 A1* 6/2005 Blecka ............... G01N 35/0099
422/64
2012/0237398 A1   9/2012 Katsumi et al.
(Continued)

FOREIGN PATENT DOCUMENTS

CN     110360795 A    10/2019
JP     2005-291731 A  10/2005
(Continued)

OTHER PUBLICATIONS

Partial Supplementary European Search Report issued on Mar. 22, 2024 for European Patent Application No. 21766377.2.
(Continued)

*Primary Examiner* — Jennifer Wecker
(74) *Attorney, Agent, or Firm* — Volpe Koenig

(57) ABSTRACT

Provided is an automatic analysis device that can suppress the occurrence of condensation in a reagent cool box and can immediately drain the condensation water generated by introducing outside air. In an automatic analysis device including a reagent cool box that stores a plurality of reagent vessels while keeping the reagent vessels cool, the reagent cool box includes a drain for discharging the condensation water generated inside the reagent cool box, and an outside air introduction path that guides air outside the reagent cool box to the inside, wherein the outside air introduction path is provided along a bottom surface of the reagent cool box, and an outside air discharge port is formed toward an upper opening unit of the drain.

6 Claims, 9 Drawing Sheets

(52) U.S. Cl.
CPC .............. *G01N 2035/00445* (2013.01); *G01N 2035/0443* (2013.01)

(58) Field of Classification Search
CPC .......... G01N 2035/00386; G01N 2035/00435; G01N 2035/00445; G01N 2035/0443; G01N 35/00; G01N 35/1002
See application file for complete search history.

(56) References Cited

U.S. PATENT DOCUMENTS

| | | | |
|---|---|---|---|
| 2018/0246132 A1* | 8/2018 | Mori | G01N 35/1002 |
| 2018/0364267 A1 | 12/2018 | Shinohara | |
| 2022/0317140 A1* | 10/2022 | Fukuda | B01L 3/502 |

FOREIGN PATENT DOCUMENTS

| | | |
|---|---|---|
| JP | 2013-185980 A | 9/2013 |
| JP | 2014-002001 A | 1/2014 |
| JP | 2015-064220 A | 4/2015 |
| JP | 2019-002927 A | 1/2019 |
| WO | 2017/038546 A1 | 3/2017 |

OTHER PUBLICATIONS

Extended European Search Report issued on Jun. 14, 2024 for European Patent Application No. 21766377.2.
International Search Report, PCT/JP2021/006240, dated Apr. 6, 2021 (5 pgs.).
International Preliminary Report on Patentability(Chapter II of the Patent Cooperation Treaty), Jan. 4, 2022.

* cited by examiner

[FIG. 1]
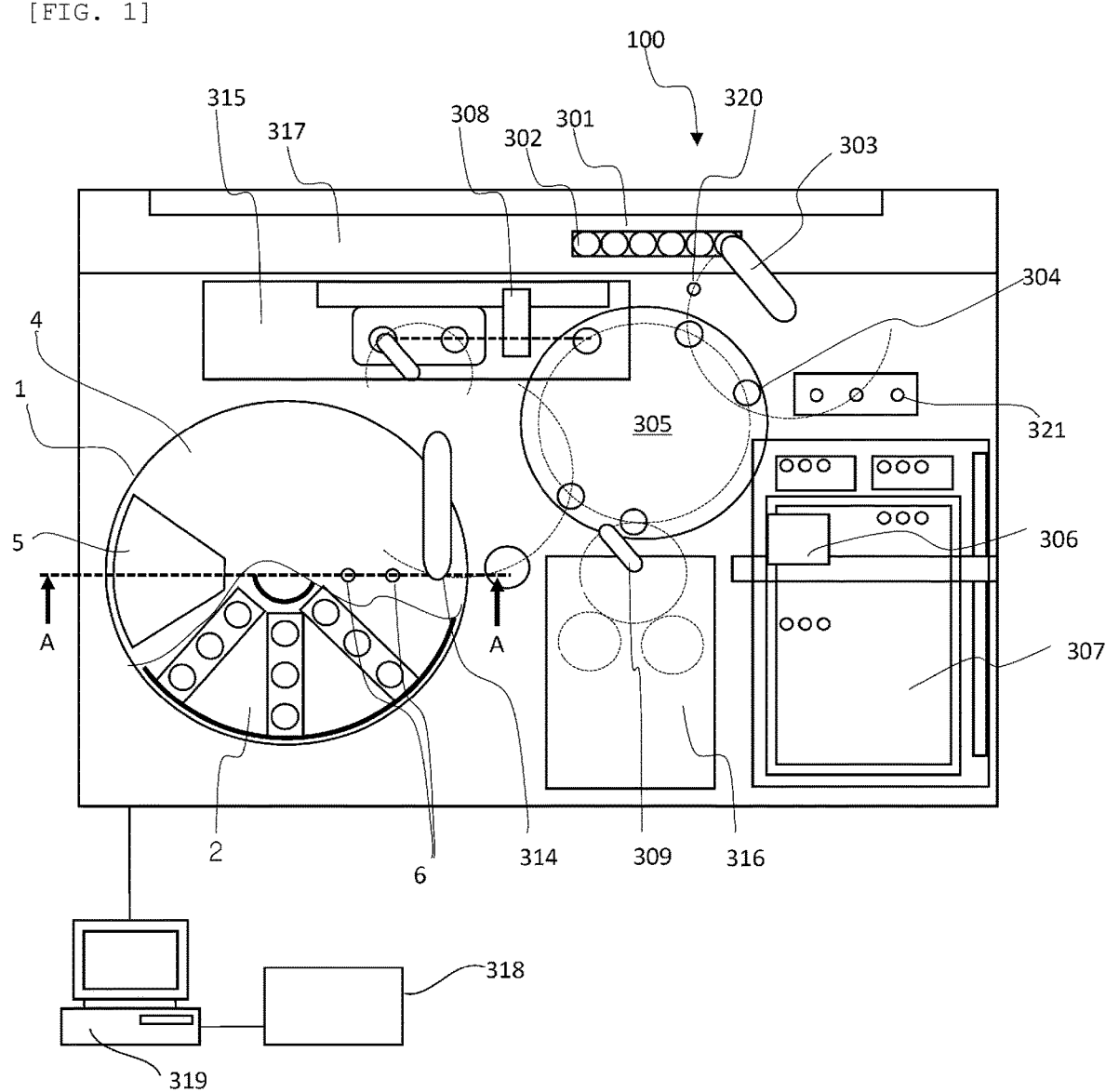

[FIG. 2]
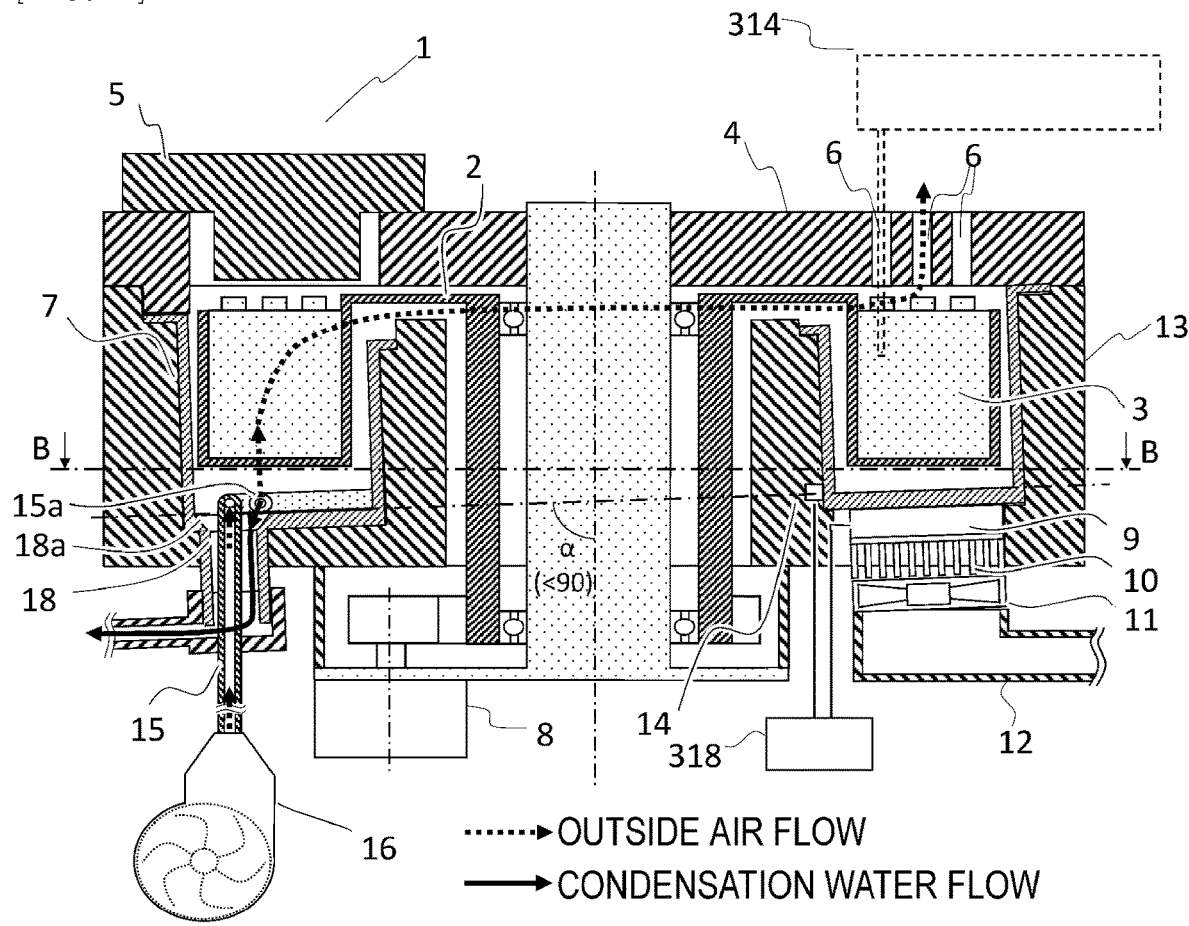

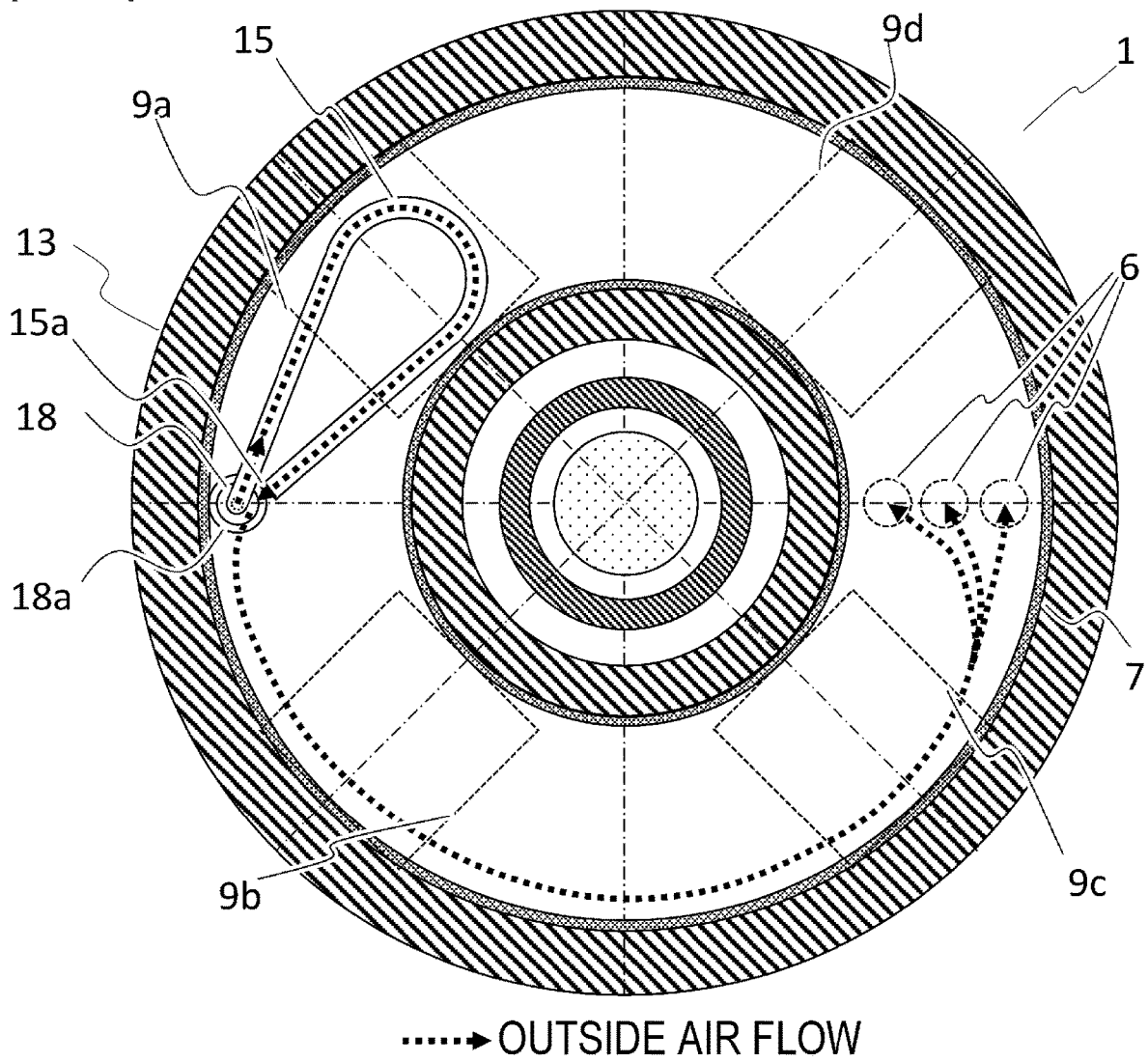

[FIG. 4]
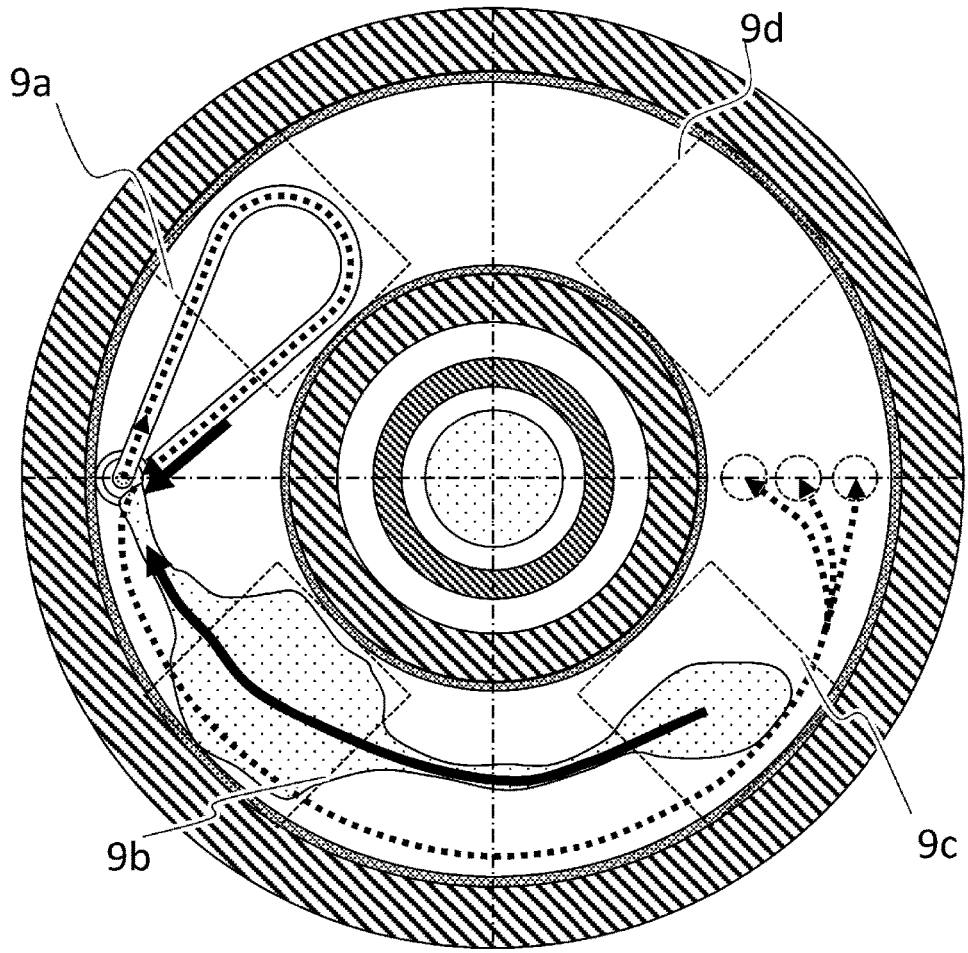
·····▶ OUTSIDE AIR FLOW
⟶ CONDENSATION WATER FLOW
◯ RANGE WHERE CONDENSATION OCCURS

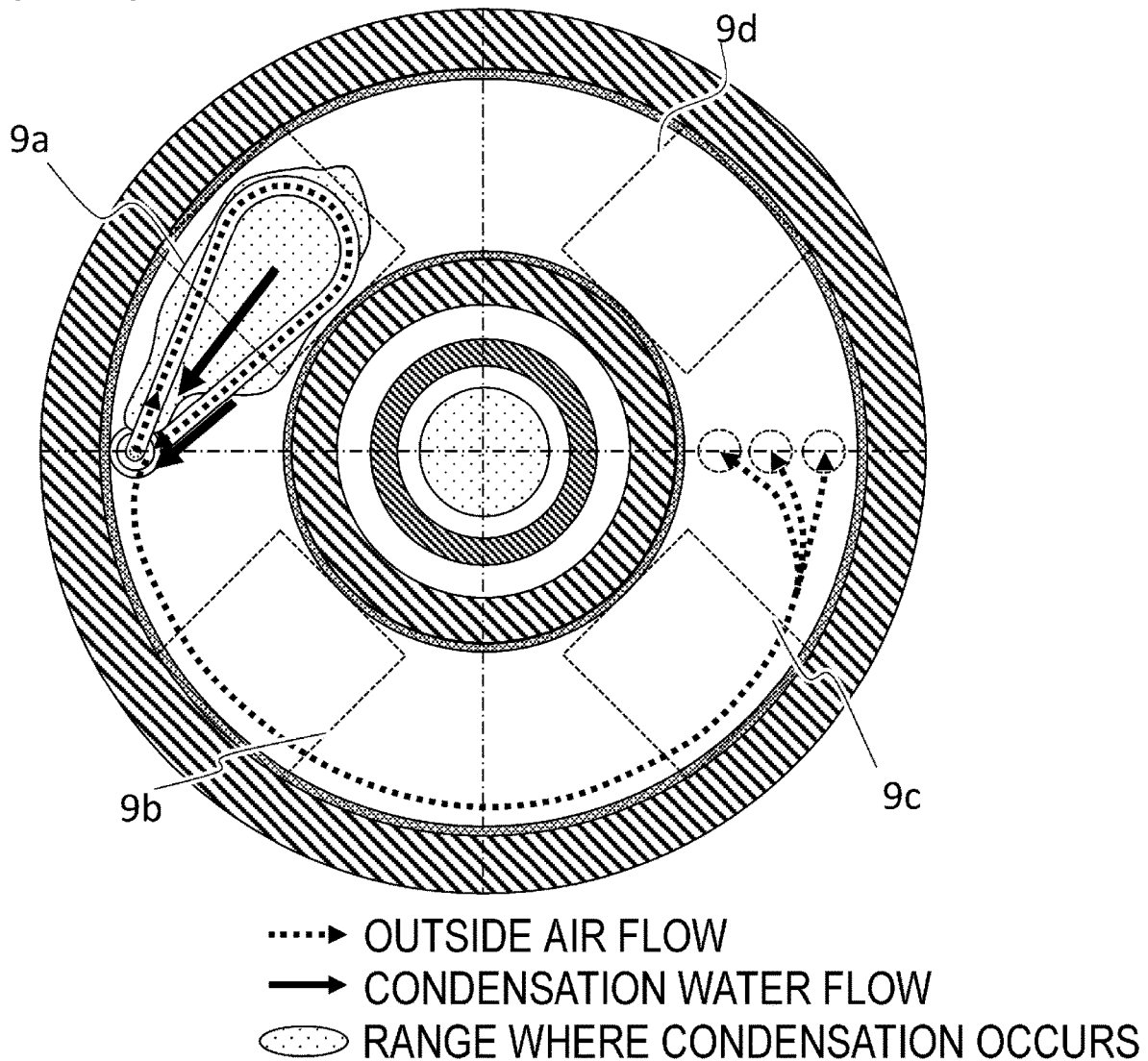

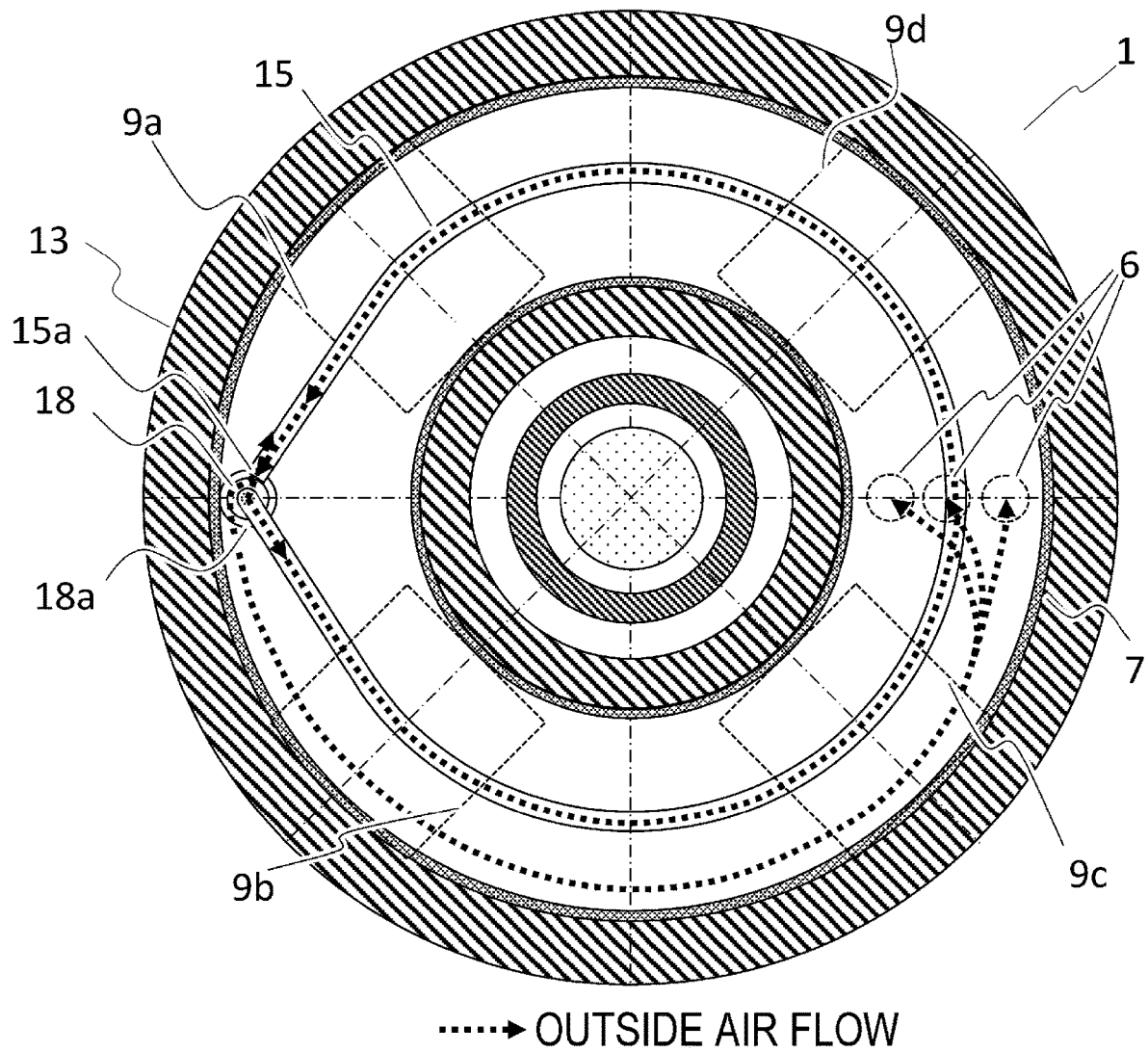
[FIG. 6]

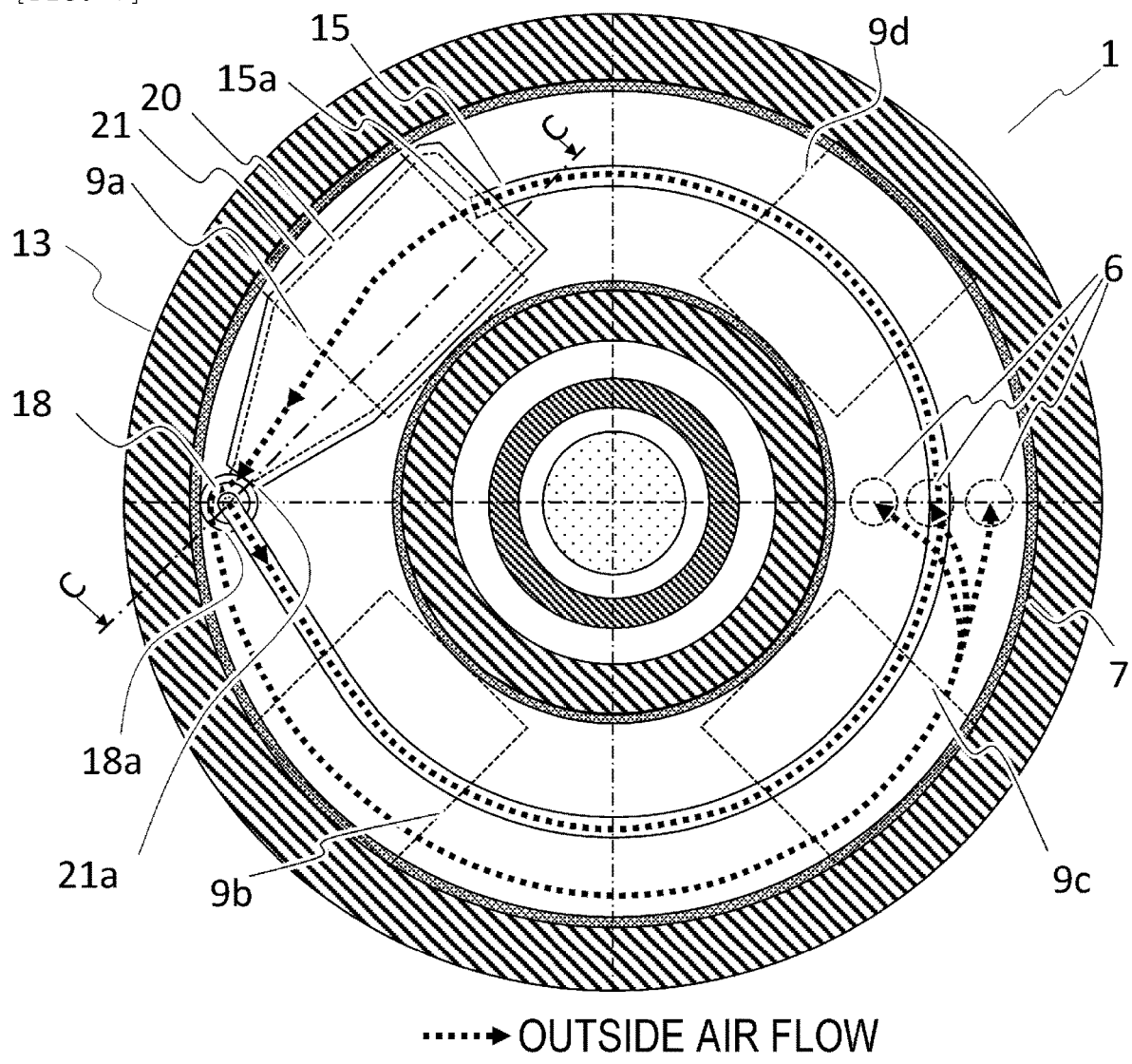
[FIG. 7]

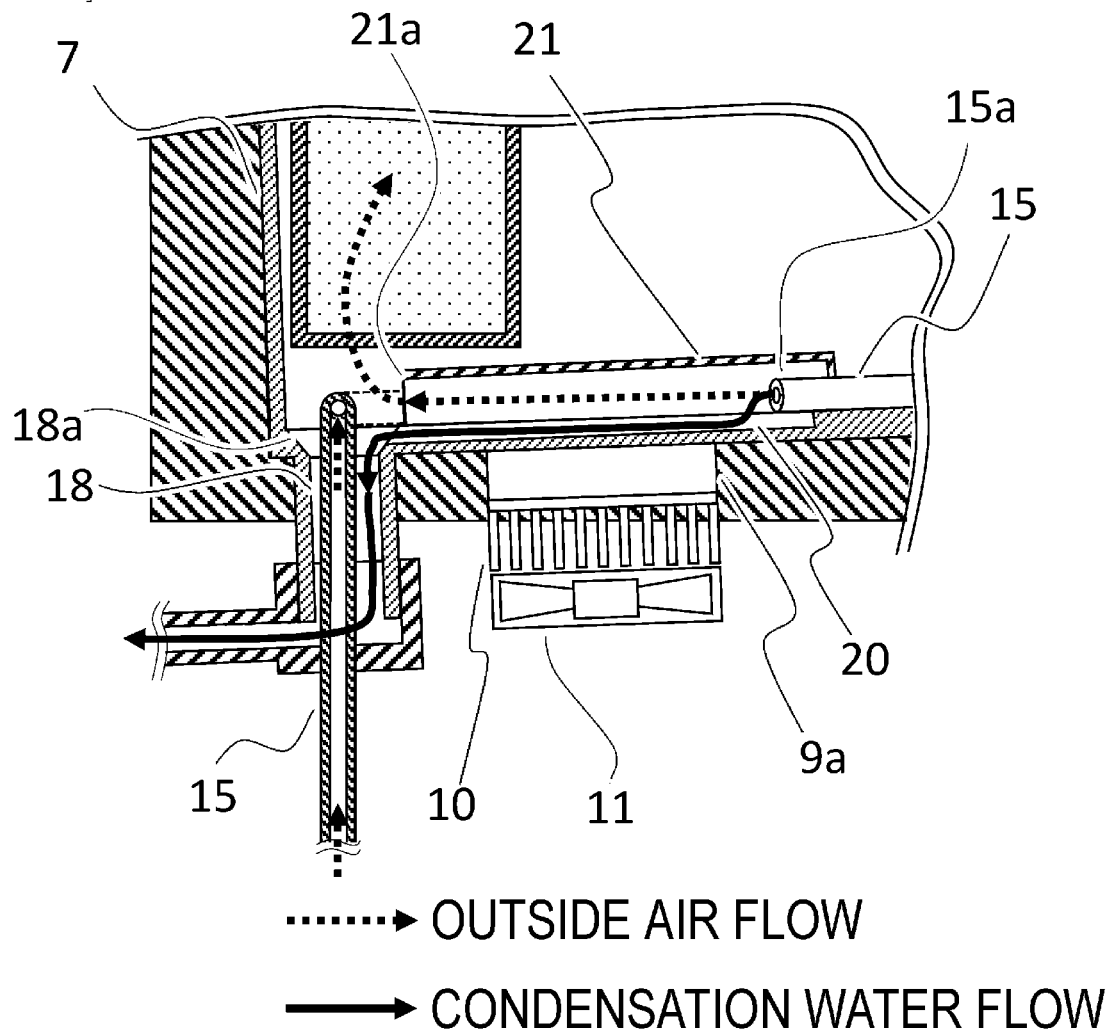
[FIG. 8]

[FIG. 9]
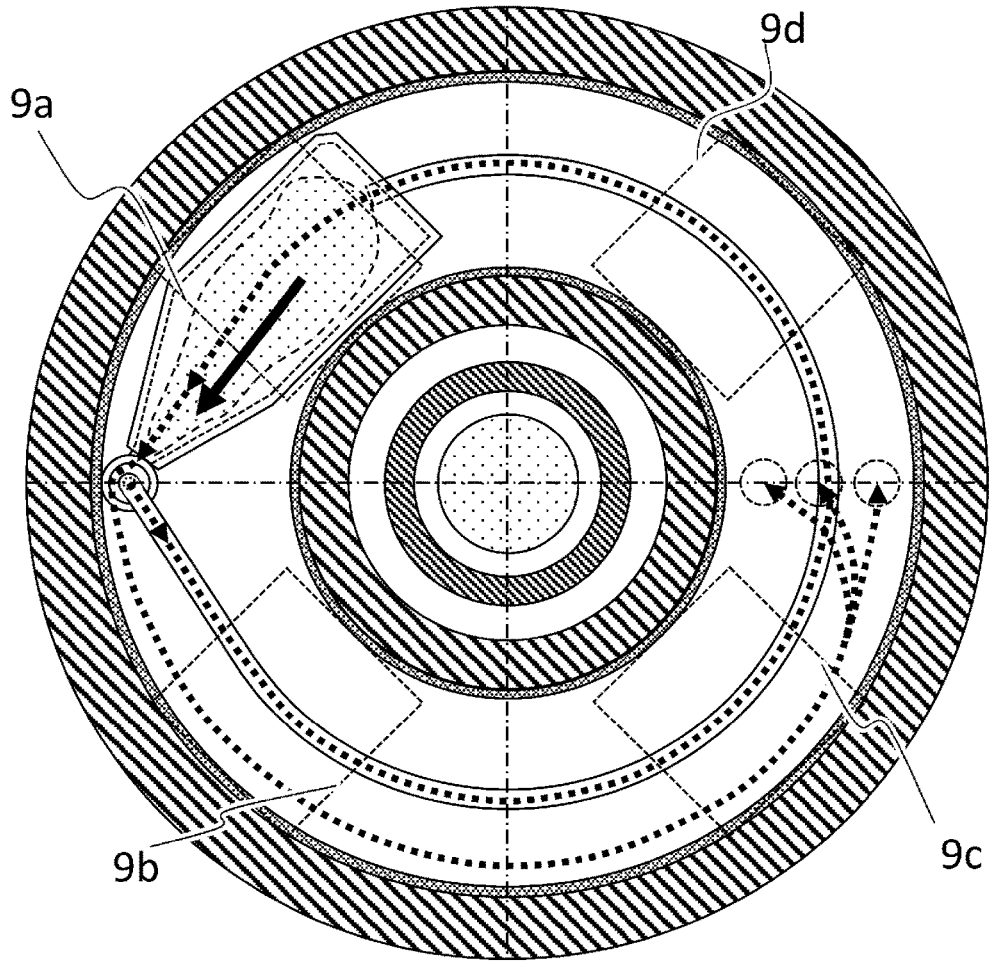
····▶ OUTSIDE AIR FLOW
⎯▶ CONDENSATION WATER FLOW
⬭ RANGE WHERE CONDENSATION OCCURS

AUTOMATIC ANALYSIS DEVICE

TECHNICAL FIELD

The present invention relates to an automatic analysis device.

BACKGROUND ART

In recent years, an automatic analysis device that analyzes a specimen (sample) such as blood or urine biochemically or immunologically has been known. Generally, analysis is made by causing a specimen and a reagent to react with each other, in which the reaction between the reagent and specimen is optically and electrically detected.

In this type of automatic analysis device, each of the reagents that are used for reaction is put in a vessel and the vessel is placed in the reagent setting area of a reagent cool box. The inside of the reagent cool box is kept cool, for example, at a temperature of 5° C. to 12° C. or so.

Usually, in the automatic analysis device, the reagent cool box has a through-hole for aspiration of a reagent in order to aspirate the reagent from a reagent vessel set in the reagent cool box. As outside air with high temperature and humidity enters the cool box from the through-hole, the following problem may arise: the temperature inside the reagent cool box rises or the inflowing outside air is cooled to below the dew point, resulting in condensation in the cool box. The rise in the temperature inside the cool box is undesirable in terms of stable storage of the reagent and also condensation in the reagent cool box may cause penetration of the condensation water into the reagent vessel and change the condition of the reagent. In addition, a tag for reagent identification may be attached to the reagent vessel and in that case, the tag may be damaged due to adhesion of the condensation water to the tag.

As a solution to these problems, Patent Literature 1 proposes an automatic analysis device that directly introduces cooled air into a reagent cool box to make the pressure inside the cool box not lower than the atmospheric pressure, so that cool air blows out from a reagent aspiration hole to prevent influx of outside air through the reagent aspiration hole and thereby suppress condensation inside the reagent cool box.

CITATION LIST

Patent Literature

Patent Literature 1: Japanese Patent Application Laid-Open No. 2013-185980

SUMMARY OF INVENTION

Technical Problem

In the reagent cool box described in Patent Literature 1, if the air introduced from the cooled air introduction path into the reagent cool box contains moisture, condensation might occur inside the reagent cool box and cause the generated condensation water to stagnate on the bottom surface of the inner wall of the reagent cool box.

The object of the present invention is to provide an automatic analysis device that can suppress condensation inside the reagent cool box and immediately discharge the generated condensation water by introducing outside air.

Solution to Problem

In order to solve the above problem, according to the present invention, an automatic analysis device includes a reagent cool box that stores a plurality of reagent vessels while keeping the plurality of reagent vessels cool, in which the reagent cool box includes: a drain for discharging the condensation water generated inside the reagent cool box, and an outside air introduction path for guiding air outside the reagent cool box to the inside, and the outside air introduction path is provided along the bottom surface of the reagent cool box, and an outside air discharge port thereof is formed toward an upper opening unit of the drain.

Advantageous Effects of Invention

According to the present invention, there is provided an automatic analysis device that can suppress occurrence of condensation inside a reagent cool box and can immediately discharge the condensation water generated by introducing outside air.

BRIEF DESCRIPTION OF DRAWINGS

FIG. 1 is a plan view showing the entire configuration of an automatic analysis device according to Example 1.

FIG. 2 is a vertical sectional view showing a schematic configuration of the reagent cool box of FIG. 1 as viewed from the direction of arrow A.

FIG. 3 is a horizontal sectional view showing a schematic configuration of the reagent cool box of FIG. 2 as viewed from the direction of arrow B.

FIG. 4 is a horizontal sectional view schematically showing a state of occurrence of condensation and a flow of condensation water in a comparative example.

FIG. 5 is a horizontal sectional view schematically showing a state of occurrence of condensation and a flow of condensation water in Example 1.

FIG. 6 is a horizontal sectional view showing a schematic configuration of a reagent cool box according to Example 2.

FIG. 7 is a horizontal sectional view showing a schematic configuration of a reagent cool box according to Example 3.

FIG. 8 is a vertical sectional view showing a schematic configuration of the reagent cool box of FIG. 7 as viewed from the direction of arrow C.

FIG. 9 is a horizontal sectional view schematically showing a state of occurrence of condensation and a flow of condensation water in Example 3.

DESCRIPTION OF EMBODIMENTS

Hereinafter, embodiments of the present invention will be described in detail referring to drawings.

First Embodiment

The automatic analysis device according to this embodiment will be described referring to FIG. 1 to FIG. 5. First, the entire configuration of the automatic analysis device according to this embodiment will be described referring to FIG. 1 to FIG. 3. FIG. 1 is a plan view showing the entire configuration of the automatic analysis device according to this embodiment. FIG. 2 is a vertical sectional view schematically showing the configuration of the reagent cool box of FIG. 1 as viewed from the direction of arrow A. FIG. 3 is a horizontal sectional view schematically showing the configuration of the reagent cool box of FIG. 2 as viewed from the direction of arrow B.

As shown in FIG. 1, the automatic analysis device 100 according to this embodiment is a device that causes a specimen and a reagent to react with each other and measures the reaction liquid as a result of the reaction. The automatic analysis device 100 includes a reagent cool box 1, a reagent vessel 3, a specimen dispensing nozzle 303, a reaction table 305, a reaction vessel transport mechanism 306, a specimen dispensing tip and reaction vessel holding member 307, a reagent disk 2, a reagent dispensing nozzle 314, a processing unit 315, a detection unit 316, a rack transport line 317, and a control device 319.

Here, the rack transport line 317 is a line to transport a rack 301 capable of holding a plurality of specimen vessels 302 containing a specimen, to a specimen dispensing position or the like. The specimen dispensing nozzle 303 is a nozzle to aspirate the specimen contained in a specimen vessel 302 and discharge it into a reaction vessel 304. The reaction table 305 is a disk to induce a reaction between the specimen and reagent at a constant temperature and its temperature is maintained at a prescribed temperature by a heater (not shown) to accelerate the reaction between the specimen and reagent. A plurality of reaction vessels 304 are held in the reaction table 305, and a specimen and a reagent are mixed and made to react. The reaction vessel transport mechanism 306 transports the reaction vessel 304. The specimen dispensing tip and reaction vessel holding member 307 stores a specimen dispensing tip and a reaction vessel 304 that are disposable and used to dispense a specimen. The reagent disk 2 is a disk that stores a reagent vessel 3 and is kept cool by the reagent cool box 1 in order to store the reagent stably. The user or the reagent vessel transport mechanism (not shown) can access the reagent vessel 3 by opening an opening and closing lid 5 provided on a lid 4. A reagent aspiration hole 6 as a through-hole for aspiration of a reagent is provided in part of the lid 4. The reagent dispensing nozzle 314 is a nozzle to aspirate the reagent stored in the reagent vessel 3 in the reagent disk 2 through the reagent aspiration hole 6 and discharge it into the reaction vessel 304. The reagent vessels 3 in the reagent disk 2 contain various assay reagents (first reagents) that are used for analysis of the specimen. The processing unit 315 performs processing before analysis of the specimen by the detection unit 316. The detection unit 316 makes detection using the liquid whose reaction has been completed in the reaction vessel 304. The control device 319 controls various operations of the above members and also performs arithmetic processing to calculate the concentration of a given component of the specimen from the result of detection by the detection unit 316. The control device 319 has a temperature control unit 318 that controls the temperature of the reagent cool box 1.

Next, the overall flow of analysis in the automatic analysis device according to this embodiment will be briefly outlined. Before analysis, the user sets a reagent vessel 3 and consumables such as a specimen dispensing tip and a reaction vessel 304 that are required for analysis, in the reagent disk 2 and the specimen dispensing tip and reaction vessel holding member 307, respectively.

First, the user loads the rack 301 in the automatic analysis device with the object of analysis such as blood or urine put in the specimen vessel 302. At this time, the reaction vessel transport mechanism 306 of the automatic analysis device transports a reaction vessel 304 and a specimen dispensing tip that are unused, to the reaction table 305 and the specimen dispensing tip mounting position.

After that, since the reagent dispensing nozzle 314 is installed in a manner to be able to rotate and move up and down, it rotates and moves to above the reagent aspiration hole 6 made in the lid 4 of the reagent cool box 1 and then moves down and passes through the reagent aspiration hole 6. After that, the tip of the reagent dispensing nozzle 314 that has passed through the reagent aspiration hole 6 is inserted into the reagent in a specified reagent vessel 3 to aspirate a specified amount of reagent. Then, the reagent dispensing nozzle 314 moves up and then rotates and moves to above the specified position of the reaction table 305 and discharges the reagent into the reaction vessel 304 set in the reaction table 305.

Then, as the rack 301 passes through the rack transport line 317 and reaches the specimen dispensing position, a specimen dispensing tip is mounted on the specimen dispensing nozzle 303 to dispense the specimen from the specimen vessel 302 into the reaction vessel 304, so that reaction between the specimen and assay reagent is started. Here, reaction refers to binding of a specimen and a luminescent labeled material by antigen-antibody reaction using, as an assay reagent, a luminescent labeled antibody which reacts only with a specific antigen of the specimen. In this case, as the mixture of the specimen and assay reagent is aspirated and discharged in the specimen dispensing tip, the specimen and assay reagent are stirred. After this motion is completed, the used specimen dispensing tip is disposed of into the specimen dispensing tip disposal port 320.

After the reaction between the specimen and assay reagent is started by stirring, in some cases another reagent is further added at a specific timing to induce a reaction. For example, there is a process in which a magnetic bead with an antibody bound to its surface is further bound to the above antigen. For the process, the reaction vessel 304 that has been placed on the reaction table 305 for a prescribed time is transported to the processing unit 315 by a first transport mechanism 308. In the processing unit 315, magnetic separation and stirring of the specimen are performed as processing of the specimen before detection.

After the preprocessing process is ended, the first transport mechanism 308 again transports the reaction vessel 304 to the reaction table 305.

Regardless of whether magnetic separation has been performed or not, the reaction vessel 304 that has been placed on the reaction table 305 for the prescribed time is moved to the detection unit 316 by a second transport mechanism 309. A signal from the reaction liquid is detected by the detection unit 316 and the result of analysis is given to the user and stored in a memory device.

After the detection is completed, the reaction vessel 304 is transported to a reaction vessel disposal port 321 by the second transport mechanism 309 and reaction vessel transport mechanism 306 and disposed of.

Next, details of the structure of the reagent cool box 1 will be described referring to FIG. 2 and FIG. 3.

The reagent disk 2 is located inside the reagent cool box 1 of the automatic analysis device 100, and a plurality of reagent vessels 3 are placed in the reagent disk 2. Although the shape of the reagent cool box 1 is arbitrary, it is formed cylindrically so that the distance from the inner wall 7 of the reagent cool box 1 on the same circle is uniform. Also, the reagent disk 2 is formed so as to be circular in a plan view and the reagent vessels 3 are arranged radially in a circular pattern inside the cylindrical reagent cool box 1. Therefore, as shown in FIG. 2, when the motor 8 located outside the reagent cool box 1 rotates, the reagent disk 2 rotates in the reagent cool box 1.

Consequently, the specified reagent vessel 3 placed on the reagent disk 2 is moved to just below the reagent aspiration hole 6 and in this condition the reagent dispensing nozzle 314 indicated in FIG. 1 aspirates the reagent from the reagent vessel 3 through the reagent aspiration hole 6. As shown in FIG. 2, the reagent aspiration hole 6 is formed in the lid 4 and the outside air and the inside of the reagent cool box 1 are communicated through the reagent aspiration hole 6. In other words, the reagent aspiration hole 6 through which the reagent dispensing nozzle 314 for aspirating the reagent from the reagent vessel 3 can pass is formed in the lid 4 and the inside and outside of the reagent cool box 1 are communicated through the reagent aspiration hole 6.

Basically, the reagent vessel 3 is kept cool as the cold energy of the cooled inner wall 7 is transferred by air convection or radiation.

The inner wall 7 is cooled by being directly cooled by a cooler 9 fitted to the outside of the inner wall 7. As the cooler 9, a device that absorbs heat on one side and radiates heat on the other side by applying an electric current, for example, a Peltier element, may be used. Consequently, the heat in the reagent cool box 1 can be absorbed and the heat can be radiated to the outside of the reagent cool box 1. The radiating side of the cooler 9 is an extended heat transfer surface of a heat sink 10. The heat sink 10 is air-cooled by forced convection through air blowing by a fan 11 and the exhaust heat is discharged into an exhaust heat duct 12. The exhaust heat duct 12 is an air flow path that leads to the outside of the automatic analysis device. Instead of using the heat sink 10 and fan 11, for example, a water-cooling heat sink or the like that transfers heat by cooling water may be used in order to discharge the heat from the cooler 9.

The reagent cool box 1 in this embodiment has a plurality of coolers 9a to 9d arranged circumferentially below the bottom surface of the inner wall 7. FIG. 2 shows only the cooler 9 on the right side and, for the sake of convenience, the left part of the figure is used to explain the structure of the drain 18, etc. to drain the condensation water generated in the reagent cool box, so the cooler 9 is omitted on the left side in the figure. The pipe 15 is arranged to form an outside air introduction path that connects the point of introduction from outside the reagent cool box 1 into the reagent cool box 1 to the drain 18. In addition, as shown in FIG. 3, the pipe 15 is arranged so that it leads into the reagent cool box 1 by penetrating the bottom surface of the inner wall 7 in an area where no cooler 9 exists, and passes over the cooler 9a among the coolers. Particularly, the pipe 15 passes on the inner diameter side of the drain 18 when it leads into the reagent cool box 1, thereby offering an advantageous effect that the need for making another through-hole in the inner wall 7 is eliminated.

The temperature of each of the coolers 9 is measured by a temperature sensor 14 installed near each cooler 9. Using the measured temperature, the temperature of each cooler 9 is controlled by the temperature control unit 318 so that it becomes a preset temperature. Here, the temperature of the cooler 9a, nearest to a pipe outlet 15a, is set to a temperature lower than the temperature of the other coolers 9b, 9c, and 9d.

When the reagent cool box 1 is directly cooled by the cooler 9, if the temperature of the inner wall 7 is uniform in the vertical and horizontal directions, the reagent temperature distribution can be suppressed. For this reason, it is desirable to use a material with a high thermal conductivity such as copper or aluminum as the material of the inner wall 7. Instead of adopting the direct cooling method that uses the cooler 9 to cool the inner wall 7, the following method can be adopted: a cooling fluid path is formed in the inner wall 7 to make the cooling water flow in the path to cool the inner wall 7 so that the air in the reagent cool box 1 and the reagent vessel 3 are cooled. In this case, since the temperature distribution of the inner wall 7 depends on the temperature distribution of the cooling water, it is also possible to use a material with a relatively low thermal conductivity such as stainless steel or resin.

The temperature of the reagent cool box 1 is measured by the temperature sensor 14 fitted inside the reagent cool box 1 or on the inner wall 7. Using the measured temperature, the temperature control unit 318 controls the temperature of the cooler 9 to keep the reagent vessel 3 cool at an adequate temperature.

The reagent cool box 1 is thermally insulated by a thermal insulation 13 fitted to its outside so that the heat in the reagent cool box 1 hardly escapes outward and the reagent vessel 3 is kept cool efficiently. Preferably, the thermal insulation 13 is made of a material with a low thermal conductivity, for example, expanded polystyrene or expanded polyurethane.

If the outside air has a high temperature and a high humidity, the outside air that has entered through the reagent aspiration hole 6 may cause condensation on the reagent disk 2 or reagent vessel 3. For this reason, outside air is introduced into the reagent cool box 1 to make the pressure in the reagent cool box 1 higher than the atmospheric pressure, so that outside air can be prevented from entering through the reagent aspiration hole 6. Also, condensation on the reagent vessel 3 and reagent disk 2 can be prevented by making the temperature of the introduced outside air lower than the surface temperatures of the reagent vessel 3 and reagent disk 2.

The air introduced into the reagent cool box 1 is cooled on the pipe 15 and blown out through the pipe outlet 15a. At that time, the condensation water generated in the pipe 15 is also discharged through the pipe outlet 15a. The pipe 15 is cooled by being directly fitted to the inner wall 7. In this embodiment, the pipe outlet 15a functions as an outside air discharge port, but if another member such as an air deflector is connected to the tip of the pipe outlet 15a, the tip of the member functions as an outside air discharge port.

Furthermore, when the flow path for outside air to flow in the pipe 15 is longer, the time and area of contact between the pipe 15 and outside air increase and thus the temperature reached by the outside air introduced into the reagent cool box 1 is lower. In other words, in order to prevent condensation on the regent vessel 3 and reagent disk 2, it is desirable to design the flow path length of the pipe 15 so that the temperature of the air discharged from the pipe outlet 15a is lower than the temperature of the reagent disk and reagent vessel 3.

When the flow path of the pipe 15 is longer, pressure loss is increased, so preferably the blower 16 that is used to supply air should be able to supply air in an environment in which pressure loss is high. For example, a diaphragm pump, centrifugal fan or piezo fan may be used. In addition, it is desirable to install a filter or the like before the point of introduction of outside air in order to prevent dust or bacteria from entering the reagent cool box 1.

It is desirable that the amount of outside air introduced into the reagent cool box 1 should be not smaller than the amount of air that enters the reagent cool box 1 through the reagent aspiration hole and leaks out of the reagent cool box 1. However, in order to reduce the amount of heat loss caused by introduction of outside air and enhance the cooling efficiency, it is desirable to avoid increasing the amount of introduced outside air more than necessary.

Next, discharge of condensation water in this embodiment will be explained in detail.

As mentioned above, since condensation on the reagent vessel 3 and reagent disk 2 may cause the condensation water to enter the reagent vessel and affect the analysis performance, condensation must be suppressed. Furthermore, if the condensation generated on the wall surface in the reagent cool box 1 adheres to the surface of the inner wall 7 for a long time, the nature of the condensation water may change.

However, since the reagent cool box 1 is structured so that the reagent dispensing nozzle intermittently accesses the reagent cool box 1 through the reagent aspiration hole 6 and outside air enters it when the opening and closing lid 5 is opened to take out and put in the reagent vessel 3, even though condensation in the reagent cool box 1 can be reduced, it is difficult to eliminate condensation completely. In other words, it is desirable to prevent condensation on the reagent vessel 3 and reagent disk 2 and immediately discharge the condensation water generated in the reagent cool box 1 and pipe 15 without allowing it to stagnate in the reagent cool box 1.

Therefore, in this embodiment, the pipe outlet 15a is located near the upper opening unit 18a of the drain 18, the bottom surface of the inner wall 7 of the reagent cool box 1 is inclined at a prescribed angle with respect to the horizontal direction, and the drain 18 is located below the inclined bottom surface of the inner wall 7 of the reagent cool box 1 in the vertical direction.

Next, the structures of the bottom surface of the reagent cool box 1, the drain 18, the pipe outlet 15a, and the pipe 15 will be explained in detail.

The pipe 15 leads into the reagent cool box 1 from outside the reagent cool box 1 by penetrating the heat insulation and inner wall 7 of the reagent cool box 1 and lies along the bottom surface of the inner wall 7 of the reagent cool box 1. The pipe outlet 15a, located at the tip of the pipe 15, is formed toward the upper opening unit 18a of the drain 18. The vertical projection of the pipe outlet 15a may be within the range of the upper opening unit 18a of the drain 18.

The sectional shape of the pipe 15 can be changed. For example, it may be rectangular, circular or, trapezoidal. The number of pipes 15 and pipe outlets 15a need not be one; for example, two pipes 15 and two pipe outlets 15a may be provided or two pipe outlets 15a may be provided for one pipe 15. Preferably, the material of the pipe should be a material with a high thermal conductivity, for example, copper or aluminum, so that direct cooling by the cooler through the inner wall 7 can be done easily.

Regarding the bottom surface of the inner wall 7, the inner wall 7 is inclined with respect to the horizontal plane or only the bottom surface of the inner wall 7 is inclined with respect to the horizontal plane. The bottom surface of the inner wall 7 is inclined in a manner that only the upper opening unit 18a of the drain 18 is located at the lowermost position. While the bottom surface of the inner wall 7 is inclined with respect to the horizontal direction, the rotation axis of the reagent disk is vertical. This eliminates the need to incline the reagent vessel 3 and the reagent dispensing nozzle.

There is no restriction on the shape of the bottom surface of the inner wall 7 and it may have a groove or projection. However, it is desirable that the surface of the groove or projection should be inclined with respect to the horizontal direction or the direction in which the drain 18 is installed. The upper end of the drain 18 that is connected to the bottom surface of the inner wall 7 has the upper opening unit 18a that has a larger bore than the bore of the main body of the drain 18. The bore diameter is gradually decreased from the upper opening unit 18a to form an inclined surface which is connected to the main body of the drain 18. Therefore, the condensation water on the bottom surface of the inner wall 7 and near the drain 18 is easily guided into the drain 18.

Next, the advantageous effects of the automatic analysis device according to this embodiment will be explained.

The outside air introduced by the blower 16 is cooled as it passes through the pipe 15. Since the pipe 15 is fitted along the bottom surface of the reagent cool box 1, the outside air can be cooled to a temperature almost equal to the temperature of the reagent cool box 1. At this time, if the outside air has a high temperature and a high humidity, the temperature of the outside air is cooled and reaches the dew point or lower, and condensation occurs in the pipe 15. The generated condensation water is pushed out by the blower 16 and discharged from the pipe outlet 15a together with the cooled outside air. Since the pipe outlet 15a is formed toward the upper opening unit 18a of the drain 18, the discharged water flows into the upper opening unit 18a of the drain 18 and is immediately discharged without flowing on the other bottom surface of the inner wall 7.

Furthermore, on the surface of the inner wall 7, if the temperature of the surface of an area having a lower temperature than the outside air discharged into the reagent cool box 1 or the temperature of the outside air that has penetrated when opening and closing the opening and closing lid for replacement of the reagent vessel 3 reaches the dew point or lower, condensation occurs. This condensation is guided to the upper opening unit 18a of the drain 18 by the inclined bottom surface of the inner wall 7 of the reagent cool box 1. Here, the condensation water is discharged so that it is collected at one point, namely the upper opening unit 18a of the drain 18 that is the lowermost portion of the bottom surface of the inner wall 7. Therefore, the possibility that a certain amount of condensation water stays circularly due to the surface tension is lower than in a reagent cool box whose lowermost portion in the vertical direction is circular when the reagent cool box is viewed from above.

Furthermore, since the pipe 15 is located in contact with or adjacent to the bottom surface of the inner wall 7, the condensation water generated on the outer circumferential side of the pipe 15 and on the bottom surface of the inner wall 7 is aspirated toward the outer circumferential surface of the pipe 15 by the capillary force of the clearance between the pipe 15 and the bottom surface of the inner wall 7. The condensation water thus aspirated is guided along the outer circumference of the pipe 15 into the upper opening unit 18a of the drain 18.

Consequently, the condensation water does not stagnate on the bottom surface of the reagent cool box and the generated condensation water is always discharged into the drain 18, thereby keeping the inside of the reagent cool box 1 hygienic.

In addition, in this embodiment, among the plurality of coolers 9, the temperature of the cooler 9a located below the area where the pipe 15 lies is set to a lower temperature than the temperature of the other coolers 9b to 9d. The effect of this is explained below referring to FIG. 4 and FIG. 5.

FIG. 4 is a horizontal sectional view schematically showing a state of condensation when the coolers 9a to 9d have a fixed temperature, as a comparative example. FIG. 5 is a horizontal sectional view schematically showing a state of condensation when the cooler 9a has a lower temperature than the other coolers 9b to 9d, as in this embodiment.

In FIG. 4, the condensation that has occurred in the pipe 15 flows directly into the upper opening unit 18a of the drain 18 that is located near the pipe outlet 15a, and is discharged. Here, if the temperature of the coolers 9b and 9c is lower than the temperature of the outside air discharged from the pipe outlet 15a, condensation occurs on the coolers 9b and 9c. However, if the bottom surface of the inner wall 7 is inclined with the upper opening unit 18a of the drain 18 at the lowermost position, the condensation generated on the coolers 9b and 9c is discharged in a manner that it is collected at one point, namely the upper opening unit 18a.

On the other hand, in this embodiment, since the temperature of the discharged outside air is lower than the temperature of the bottom surface of the inner wall 7 over the coolers 9b, 9c, and 9d and hardly reaches the dew point or lower, condensation on the coolers 9b, 9c, and 9d can be suppressed, as shown in FIG. 5. Consequently, the range of occurrence of condensation can be restricted to the area around the cooler 9a and the upper opening unit 18a of the drain 18, thereby making it easier to keep most areas of the inside of the reagent cool box 1 hygienic.

Although a plurality of coolers are provided in this embodiment, the automatic analysis device may include only one cooler that is located in the area where the pipe 15 lies.

Second Embodiment

Next, the second embodiment will be described referring to FIG. 6. FIG. 6 is a horizontal sectional view schematically showing the configuration of a reagent cool box according to the second embodiment.

In the second embodiment, as shown in FIG. 6, the pipe 15 is routed so as to encompass the rotation center axis of the reagent disk. Therefore, the pipe 15 in this embodiment lies over all the coolers 9a to 9d. However, the temperature of the cooler 9a, located below the pipe 15's route nearest to the pipe outlet 15a, namely the most downstream side route of the pipe 15, is set to a lower temperature than the temperature of the coolers located below the upstream side route of the pipe 15, namely coolers 9b to 9d.

Next, the advantageous effects of the automatic analysis device according to this embodiment will be explained. In this embodiment, since the route of the pipe 15 lying on the bottom surface of the inner wall 7 is long, the outside air introduced by the blower 16 is sufficiently cooled as it passes through the pipe 15. Therefore, the temperature of the outside air discharged from the pipe outlet 15a into the reagent cool box 1 can be easily made close to the temperature of the reagent cool box 1 and thus condensation on the reagent vessel 3 and reagent disk 2 can be prevented.

Third Embodiment

FIG. 7 is a horizontal sectional view schematically showing the configuration of a reagent cool box according to the third embodiment. FIG. 8 is a vertical sectional view schematically showing the configuration of the reagent cool box of FIG. 7 as viewed from the direction of arrow C.

In this embodiment, the pipe outlet 15a is located near the cooler 9a in the reagent cool box 1 and an explanation is given below of the case that a drain groove 20 and a cover 21 lie over the cooler 9a. Therefore, the different elements from the elements of the reagent cool box 1 in the above embodiments are described below and description of the same elements is omitted.

In the reagent cool box 1 in this embodiment, the pipe outlet 15a is located near the cooler 9b and the bottom surface of the inner wall 7 and the cover 21 over it are located so as to form a flow path that connects the pipe outlet 15a to the upper opening unit 18a of the drain 18. And a cover opening end 21a and the bottom surface of the inner wall 7 form an outside air discharge port. Thus, in this embodiment, an outside air introduction path is formed by the pipe 15 on the upstream side and formed by the cover 21 and the bottom surface of the inner wall 7 on the downstream side. The drain groove 20, which is lower than the other portions of the bottom surface of the inner wall 7, is located on the bottom surface of the inner wall 7 in the area where the cover 21 is located.

The drain groove 20 is inclined so that the upper opening unit 18a of the drain 18 becomes the lowermost portion. The shape of the drain groove 20 is not limited as far as it is inclined so that the upper opening unit 18a is the lowermost portion. For example, a fin shape to increase the area of contact between outside air and the inner wall 7 may be provided over the drain groove 20. Alternatively, using the drain groove 20 and cover 21, a labyrinth flow path may be formed to increase the length of contact between outside air and the inner wall 7.

Next, the advantageous effects of this embodiment will be explained referring to FIG. 9. FIG. 9 is a horizontal sectional view schematically showing a state of occurrence of condensation in this embodiment.

The outside air introduced by the pipe 15 enters the cover 21 from the pipe outlet 15a and passes through the outside air introduction path constituted by the clearance between the drain groove 20 and cover 21 and is discharged from the outside air discharge port at the tip of the cover 21 toward the upper opening unit 18a into the reagent cool box 1. The generated condensation water passes through the drain groove 20 and is discharged into the upper opening unit 18a of the drain 18. Here, since the distance between the surface of the drain groove 20 and the cooler 9a in the thickness direction is smaller than in the areas where the other coolers 9b, 9c, and 9d are installed, the surface temperature on the drain groove 20 over the cooler 9a is lower than over the coolers 9b, 9c, and 9d. Consequently, the temperature of the outside air discharged from near the drain 18 into the reagent cool box 1 is lower than the surface temperature of the inner wall 7 over the coolers 9b, 9c, and 9d, so occurrence of condensation in the reagent cool box 1 can be suppressed more effectively than in the first and second embodiments. In addition, in the area over the cooler 9a, which is lowest in temperature and likely to cause condensation, the area of contact with the bottom surface of the inner wall 7 is larger and the outside air-cooling efficiency is higher, so condensation can be concentrated on this area and thus condensation in the other areas of the bottom surface of the inner wall 7 can be suppressed.

In this embodiment, the same effect can also be achieved by making the temperature of the cooler 9a lower than the temperature of the other coolers 9b, 9c, and 9d.

The present invention is not limited to the above embodiments but includes many types of variations. An element of an embodiment may be replaced by an element of another embodiment or an element of an embodiment may be added to another embodiment. Also, for some elements of each embodiment, addition, deletion, or replacement of elements can be made.

REFERENCE SIGNS LIST

1: reagent cool box
2: reagent disk
3: reagent vessel
4: lid
5: opening and closing lid
6: reagent suction hole
7: inner wall
8: motor
9: cooler
10: heat sink
11: fan
12: exhaust heat duct
13: thermal insulation
14: temperature sensor
15: pipe
15a: pipe outlet
16: blower
18: drain
18a: upper opening unit of drain
20: drain groove
21: cover
21a: cover opening end
100: automatic analysis device
301: rack
302: specimen vessel
303: specimen dispensing nozzle
304: reaction vessel
305: reaction table
306: reaction vessel transport mechanism
307: specimen dispensing tip and reaction vessel holding member
308: first transport mechanism
309: second transport mechanism
314: reagent dispensing nozzle
315: processing unit
316: detection unit
317: rack transport line
318: temperature control unit
319: control device
320: specimen dispensing tip disposal port
321: reaction vessel disposal port

The invention claimed is:

1. An automatic analysis device comprising a reagent cool box that stores a plurality of reagent vessels while keeping the plurality of reagent vessels cool, wherein the reagent cool box includes: a drain configured for discharging the condensation water generated inside the reagent cool box, and a pipe-like outside air introduction path configured for guiding air outside the reagent cool box to the inside, and the outside air introduction path configured to penetrate an inner wall of the reagent cool box by passing through an inner diameter side of the drain, such that the outside air introduction path is disposed along a bottom surface of the reagent cool box and within the drain, and an outside air discharge port thereof is formed towards an upper opening unit of the drain.

2. An automatic analysis device comprising a reagent cool box that stores a plurality of reagent vessels while keeping the plurality of reagent vessels cool, wherein the reagent cool box includes: a drain configured for discharging condensation water generated inside the reagent cool box, and a pipe-like outside air introduction path configured to guide air outside the reagent cool box to the inside, and the outside air introduction path is configured to penetrate an inner wall of the reagent cool box by passing through an inner diameter side of the drain and be disposed along a bottom surface of the reagent cool box, and wherein a vertical projection of an outside air discharge port thereof is within a range of an upper opening unit of the drain.

3. An automatic analysis device comprising a reagent cool box that stores a plurality of reagent vessels while keeping the plurality of reagent vessels cool, wherein the reagent cool box includes: a drain configured for discharging condensation water generated inside the reagent cool box, and an outside air introduction path configured to guide air outside the reagent cool box to the inside, and wherein an inner wall surface of the reagent cool box is inclined, and towards one point as an upper opening unit of the drain; and wherein the outside air introduction path is disposed within on an inner diameter side of the drain.

4. An automatic analysis device comprising a reagent cool box that stores a plurality of reagent vessels while keeping the plurality of reagent vessels cool, wherein the reagent cool box includes: a drain configured for discharging the condensation water generated inside the reagent cool box, an outside air introduction path configured to guide the air outside the reagent cool box to the inside, and wherein the outside air introduction path is disposed within the drain, and a plurality of coolers provided below the bottom surface of the inner wall of the reagent cool box, and the cooler located below the air introduction path on the most downstream side is set to a lower temperature than the other coolers.

5. The automatic analysis device according to claim 1, wherein
the upstream side of the outside air introduction path is formed by a pipe guiding from the outside of the reagent cool box to the inside, the downstream side thereof is formed by the bottom surface of the inner wall of the reagent cool box and a cover provided thereabove, and
the outside air discharge port is formed at an opening end of the cover.

6. The automatic analysis device according to claim 5, wherein
the bottom surface of the inner wall located below the cover is provided with a drain groove that is lower than the bottom surfaces of the other inner walls.

* * * * *